United States Patent [19]

Riley

[11] Patent Number: 4,567,031
[45] Date of Patent: Jan. 28, 1986

[54] PROCESS FOR PREPARING MIXED METAL OXIDES

[75] Inventor: Brian Riley, Willimantic, Conn.

[73] Assignee: Combustion Engineering, Inc., Windsor, Conn.

[21] Appl. No.: 565,964

[22] Filed: Dec. 27, 1983

[51] Int. Cl.$^4$ .................... C01D 15/00; C01G 51/00; C01G 53/00
[52] U.S. Cl. .................... 423/593; 423/594; 423/598; 423/595; 423/596; 423/599
[58] Field of Search .................... 423/594, 593, 598

[56] References Cited

U.S. PATENT DOCUMENTS

| | | | |
|---|---|---|---|
| 3,484,376 | 12/1969 | Paris et al. | 423/594 |
| 3,686,347 | 8/1972 | Dean et al. | 423/594 |
| 3,887,479 | 6/1975 | McLain | 423/594 |
| 4,062,920 | 12/1977 | Lindquist | 423/594 |
| 4,289,745 | 9/1981 | Patil et al. | 423/594 |
| 4,292,294 | 9/1981 | Patil et al. | 423/594 |

FOREIGN PATENT DOCUMENTS 1264800  2/1972  United Kingdom ................ 423/594

OTHER PUBLICATIONS

Johnson, W. D.; Heikes R. R. and Sestrich, D., "The Preparation, Crystallography and Magnetic Properties of $Li_xCo_{1-x}O$ System", *J. Phys. Chem. Solids*, Pergamon Press, vol. 7, pp. 1–13, (1958).

Johnston, W. D. and Heikes, R. R., *J. Amer. Chem. Soc.* vol. 78, p. 3255, (1956).

Goodenough, J. B., et al, "New Fast Ion Conductors", *Proc. Battery Application*, Brussels, Jan. 17, 1979, p. 185, Commission of the European Communities.

Mizoshima, K.; Jones P. C.; Wiseman, P. J. and Goodenough, J. B., "$Li_xCoO_2$: A New Cathode Material for Batteries of High Energy Density", *Mat. Res. Bull.*, vol. 15, pp. 783–789, (1980).

Delmas, C.; Bracconier, J. J. and Hagenmuller, P., "A New Variety of $LiCoO_2$ With an Unusual Oxygen Packing Obtained by Exchange Reaction", *Mat. Res. Bull.*, vol. 17, pp. 117–123, (1982).

Fouassier, C.; Matejka, G.; Reau, J. M. and Hagenmuller, P., "On The New Oxygenated Bronzes of the Formula $Na_xCoO_2$ ($X<1$) . . . The Cobalt-Oxygen-Sodium System", *J. Solid State Chem.* vol. 6, pp. 532–537, (1973).

*Primary Examiner*—H. T. Carter
*Attorney, Agent, or Firm*—Brumbaugh, Graves, Donohue & Raymond

[57] ABSTRACT

A process for preparing a mixed metal oxide, usable as the cathode or intercalation electrode in high energy density primary and secondary batteries, having the formula $Li_xM_yO_z$ where M is at least one metal selected from the group consisting of titanium, chromium, manganese, iron, cobalt and nickel, x is a number from about 0.1 to about 1.1, preferably from about 0.9 to about 1.1, y is a total number from about 1.1 to about 0.1, preferably from about 1.1 to about 0.9, respectively, and z is a number from about 1.9 to about 2.1, such as $LiCoO_2$ or [$Li(Co_{0.5}Ni_{0.5})O_2$], is comprised by preparing a mixed solution containing x moles of a soluble oxygen-containing salt of lithium and y total moles of soluble oxygen-containing salt(s) of the at least one metal M in a solvent therefor; concentrating the mixed solution; co-crystalizing a mixed salt of lithium and of the at least one metal M from the concentrated mixed solution; and calcining the co-crystallized mixed salt at a low temperature of from about 400° C. to about 500°C. for a short period of time of from about 1 hour to about 4 hours to form the mixed metal oxide.

18 Claims, No Drawings

PROCESS FOR PREPARING MIXED METAL OXIDES

The present invention relates to an improved process for preparing a mixed metal oxide, such as lithium cobalt oxide ($LiCoO_2$) or lithium cobalt-nickel oxide [$Li(Co_{0.5}Ni_{0.5})O_2$], useable as the cathode or intercalation electrode in high energy density primary and secondary batteries.

BACKGROUND OF THE INVENTION

It has been reported heretofore that cells containing cathodes made from lithium cobalt oxide ($LiCoO_2$) or from lithium nickel oxide ($LiNiO_2$) exhibit favorable electrical and chemical properties which could be of use in the high energy density battery fields.

The three main methods heretofore for the preparation of lithium cobalt oxide ($LiCoO_2$) are as follows:

1. Molecular proportions of lithium carbonate ($Li_2CO_3$) and cobalt carbonate ($CoCO_3$) are intimately mechanically mixed and pressed into pellets. The pellets are heated in air at 900° C. for 20 hours followed by two further annealings. The quench from high temperature is of utmost importance to preserve the high temperature "rock salt" structure at low temperature.

2. Another similar high temperature solid state reaction is by mixing lithium oxide ($Li_2O_2$) and cobalt oxide (CoO) and heating the mixture at 900° C. in air for an extended period (1-3 days).

3. A new variety of lithium cobalt oxide ($LiCoO_2$) has been obtained by using an extraction exchange reaction of sodium cobalt oxide ($NaCoO_2$) and lithium chloride (LiCl) in methanol over a three day period.

In all the above three known methods of preparation, either high temperatures or extended times are necessary. The high temperatures and extended times are conditions for grain growth and reduction in surface area. Both these criteria, however, are in opposition to favorable properties for use of the lithium cobalt oxide ($LiCoO_2$) in a high energy density battery.

The importance of retaining the "rock salt" structure has been emphasized and it is a reflection on the extent of the "work heat" (900° C., 1-2 days) impressed upon the solid mixture to force the solid state reaction to completion.

SUMMARY OF THE INVENTION

The object of the present invention is to provide an improved process for preparing a mixed metal oxide, such as lithium cobalt oxide ($LiCoO_2$) or lithium cobalt-nickel oxide [$Li(Co_{0.5}Ni_{0.5})O_2$], using low temperatures and short time periods.

The present invention is based upon a preordering of the ratio of metal ions in solution followed by co-crystallization or co-precipitation and finally calcination at low temperatures to preserve the "rock salt" perfect homogeneous array of the metal atoms in the mixed metal oxide final product. Hence the majority of the "work heat" necessary heretofore for solid state diffusion can be reduced.

DETAILED DESCRIPTION

The improved process of the present invention for preparing a mixed metal oxide having the formula $Li_xM_yO_z$ where M is at least one metal selected from the group consisting of titanium, chromium, manganese, iron, cobalt and nickel, x is a number from about 0.1 to about 1.1, preferably from about 0.9 to about 1.1, y is a total number from about 1.1 to about 0.1, preferably from about 1.1 to about 0.9, respectively, and z is a number from about 1.9 to about 2.1, such as $LiCoO_2$ or [$Li(Co_{0.5}Ni_{0.5})O_2$], is comprised by preparing a mixed solution containing x moles of a soluble oxygen-containing salt of lithium and y total moles of soluble oxygen-containing salt(s) of the at least one metal M in a solvent therefor; concentrating the mixed solution; co-crystallizing (or co-precipitating) a mixed salt of lithium and of the at least one metal M from the concentrated mixed solution; and calcining the co-crystallized (or co-precipitated) mixed salt at a low temperature of from about 400° C. to about 500° C. for a short period of time of from about 1 hour to about 4 hours to form the mixed metal oxide.

The mixed solution can be prepared by blending together separate solutions of the soluble oxygen-containing salt of lithium and of the soluble oxygen-containing salts(s) of the at least one metal M. However, it is preferred to prepare the mixed solution by dissolving the soluble oxygen-containing salt of lithium and the soluble oxygen-containing salt(s) of the at least one metal M in a solvent therefor.

The mixed solution can be concentrated by any appropriate technique, such as, by evaporating it or by vacuum distilling it.

The mixed salt can be co-crystallized (co-precipitated) by a variety of techniques, such as, by rapidly freeze drying the concentrated mixed solution under a vacuum, by two-phase partitioning (sol-gel) the concentrated mixed solution, by flash evaporating the concentrated mixed solution (spraying it onto hot rollers), by spray drying the concentrated mixed solution (spraying it into a hot chamber), and by explosively dehydrating the concentrated mixed solution (by spraying into a vacuum).

The co-crystallized mixed salt can be calcined in a stream of air or in a stream of carbon monoxide and carbon dioxide where fine tuning of the stoichiometry of the ratio of the mixed metal atoms to oxygen atoms in the mixed metal oxide final product is desired.

Soluble oxygen-containing salts useful in the process of the invention include, for example, the nitrates, the oxalates and the acetates of lithium and of the at least one metal M. An appropriate solvent for such soluble oxygen-containing salts is selected and includes, for example, water, methanol and ethanol.

The process of the present invention is illustrated by the following representative examples thereof.

EXAMPLE 1

Preparation of Lithium Cobalt Oxide ($LiCoO_2$)

68.9 g. (1 mole) of lithium nitrate ($LiNO_3$) and 291 g. (1 mole) of cobalt nitrate [$Co(NO_3)_2 \cdot 6 H_2O$], i.e., equimolar amounts, are dissolved by warming (about 60° C.-80° C.) in distilled water (about 100 ml.). A clear, pink-violet solution is produced.

The solution is allowed to evaporate until the first evidence of crystals appear either on the surface or the edges of the solvent.

The warm (about 60° C.-80° C.) solution is then placed in a round-bottom glass flask. The flask is spun around in a bath of freezing mixture (e.g., carbon dioxide/methanol or liquid air) while a rough vacuum is then pulled. The solution rapidly freezes out on the inner surface of the flask. The latent heat of evaporation (endothermic) keeps the solution solid while the water (solvent) is pumped off. After all the water is evaporated (change in pump pressure for vapor pressure of water), the mixed salt is removed from the flask for calcination.

Freeze-dried mixed crystals are placed in an open crucible inside a muffle furnace in a hood enclosure. Air is circulated freely through the furnace. The heating rate is approximately from room temperature to 400° C. in about 3–4 hours. The time at soaking temperature (400° C.) is about 1–4 hours, depending on the weight of the powder. After soaking, the crucible can, if necessary, be withdrawn into the laboratory air for quenching or the muffle furnace allowed to cool slowly.

Analysis of the final product by X-ray diffraction shows it is lithium cobalt oxide ($LiCoO_2$).

EXAMPLE 2

Preparation of Lithium Cobalt-Nickel Oxide [$Li(Co_{0.5}Ni_{0.5})O_2$]

68.9 g. (1 mole) of lithium nitrate ($LiNO_3$), 145.5 g. ($\frac{1}{2}$ mole) of cobalt nitrate [$Co(NO_3)_2 \cdot 6 H_2O$] and 145.4 g. ($\frac{1}{2}$ mole) of nickel nitrate [$Ni(NO_3)_2 \cdot 6 H_2O$] are dissolved by warming (about 60° C.–80° C.) in distilled water (about 100 ml.). A dark violet solution is produced.

The solution is allowed to evaporate until the first evidence of crystals appear either on the surface or on the edge of the solution.

The solution is then treated as set forth in Example 1.

Analysis of the final product by X-ray diffraction shows it is lithium cobalt-nickel oxide [$Li(Co_{0.5}Ni_{0.5})O_2$].

In an identical manner to Example 1, the ratio of Li:(Co:Ni) and/or the ratio of Co:Ni, and/or the oxygen stoichiometry can be adjusted by varying the starting proportions of the nitrates and oxygen potential in the calcination stage by use of $CO/CO_2$ mixtures, respectively.

Although rapid freeze drying is used in the above two examples to co-crystallize (co-precipitate) the mixed salts, other techniques, such as rapid evaporation, hot spray drying, co-precipitation by organic solvent addition, sol-gel precipitation, steam evaporation, hot drum flash evaporation, etc., can also be used.

The economic and technical advantages of the process of the present invention are numerous. Thus, the metal atoms are in perfect homogeneous array on the macro scale in the mixed metal oxide final product; the calcination conditions of temperature and time are much lower than in the heretofore known processes; the low temperature calcination produces a high surface area powder (e.g., about 20–40 $m^2/g$) of small particle size (e.g., about 0.1–2$\mu$); the ratio of metal ions, as well as the ratio of mixed metal ions to oxygen, can easily be modified; and the final formation of the mixed metal oxide is a relatively simple calcination at low temperature and not a high temperature solid state diffusion process.

What is claimed is:

1. A process for preparing a mixed metal oxide having the formula $Li_xM_yO_z$ where M is cobalt or cobalt and nickel, x is a number from about 0.1 to about 1.1, y is a total number from about 1.1 to about 0.1, respectively, and z is a number from about 1.9 to about 2.1 which comprises
preparing a mixed solution containing x moles of a soluble oxygen-containing salt of lithium and y total moles of soluble oxygen-containing salt(s) of M in a solvent therefor, the soluble oxygen-containing salts being nitrates, oxalates or acetates;
concentrating the mixed solution;
co-crystallizing a mixed salt of lithium and of M from the concentrated mixed solution; and
calcining the co-crystallized mixed salt at a low temperature of from about 400° C. to about 500° C. for a short period of time of from about 1 hour to about 4 hours to form the mixed metal oxide.

2. A process according to claim 1, wherein x is a number from about 0.9 to about 1.1 and y is a total number from about 1.1 to about 0.9, respectively.

3. A process according to claim 1, wherein the mixed solution is concentrated by evaporating it.

4. A process according to claim 1, wherein the mixed solution is concentrated by vacuum distilling it.

5. A process according to claim 1, wherein the mixed salt is co-crystallized by rapidly freeze drying the concentrated mixed solution under a vacuum.

6. A process according to claim 1, wherein the mixed salt is co-crystallized by two-phase partitioning the concentrated mixed solution.

7. A process according to claim 1, wherein the mixed salt is co-crystallized by flash evaporating the concentrated mixed solution.

8. A process according to claim 1, wherein the mixed salt is co-crystallized by spray drying the concentrated mixed solution.

9. A process according to claim 1, wherein the mixed salt is co-crystallized by explosively dehydrating the concentrated mixed solution.

10. A process according to claim 1, wherein the co-crystallized mixed salt is calcined in a stream of air.

11. A process according to claim 1, wherein the co-crystallized mixed salt is calcined in a stream of carbon monoxide and carbon dioxide.

12. A process according to claim 1, wherein the soluble oxygen-containing salts are nitrates and the solvent is water.

13. A process according to claim 1, wherein the soluble oxygen-containing salts are oxalates and the solvent is water.

14. A process according to claim 1, wherein the soluble oxygen-containing salts are acetates and the solvent is water.

15. A process according to claim 1, wherein the mixed metal oxide has a high surface area of from about 20 $m^2/g$ to about 40 $m^2/g$.

16. A process according to claim 1, wherein the mixed metal oxide has a small particle size of from about 0.1 $\mu$ to about 2$\mu$.

17. A process for preparing a mixed metal oxide having the formula $LiCoO_2$, which comprises
preparing a mixed aqueous solution containing equimolar amounts of lithium nitrate and cobalt nitrate;
concentrating the mixed solution by evaporating it;
co-crystallizing an equimolar mixed lithium cobalt nitrate salt from the concentrated mixed solution by rapidly freeze drying the concentrated mixed solution; and
calcining the co-crystallized mixed salt at a low temperature of from about 400° C. to about 500° C. for a short period of time of from about 1 hour to about 4 hours in a stream of air to form the mixed metal oxide.

18. A process for preparing a mixed metal oxide having the formula $Li(Co_{0.5}Ni_{0.5})O_2$ which comprises preparing a mixed aqueous solution containing one mole of lithium nitrate and one-half mole each of cobalt nitrate and nickel nitrate;

concentrating the mixed solution by evaporating it;

co-crystallizing a mixed lithium cobalt-nickel nitrate salt from the concentrated mixed solution by rapidly freeze drying the concentrated mixed solution; and calcining the co-crystallized mixed salt at a low temperature of from about 400° C. to about 500° C. for a short period of time of from about 1 hour to about 4 hours in a stream of air to form the mixed metal oxide.

* * * * *